United States Patent [19]

MacInnes

[11] 4,027,994
[45] June 7, 1977

[54] PARTIALLY DIVIDED TURBINE HOUSING FOR TURBOCHARGERS AND THE LIKE

[75] Inventor: Hugh MacInnes, La Canada, Calif.

[73] Assignee: Roto-Master, Inc., North Hollywood, Calif.

[22] Filed: Aug. 8, 1975

[21] Appl. No.: 602,928

[52] U.S. Cl. .................................. 415/1; 415/203; 415/205

[51] Int. Cl.$^2$ .......................................... F01D 1/06

[58] Field of Search ....................... 415/203, 205, 1

[56] References Cited

UNITED STATES PATENTS

| 3,408,046 | 10/1968 | Weber, Jr. | 415/205 |
| 3,552,876 | 1/1971 | Updike | 415/205 |

FOREIGN PATENTS OR APPLICATIONS

| 1,949,484 | 10/1966 | Germany | 415/205 |

Primary Examiner—Henry F. Raduazo
Attorney, Agent, or Firm—Mahoney, Schick & Cislo

[57] ABSTRACT

A 360° volute, radial inflow turbine housing has the housing chamber inlet and housing chamber with a radial divider extending circumferentially of the housing chamber for between approximately 180° and 300° dividing the housing chamber into axially adjacent parts for the extent of the divider which ultimately opens circumferentially into a common chamber part extending circumferentially over the remainder of the housing chamber. All of the housing chamber divided and common parts communicate generally radially inwardly to a generally central turbine wheel location. At the transition between the housing chamber divided parts into the common part and for the remainder of the chamber, it is preferred for optimum results to maintain the chamber radial cross section in its normal circumferential volute reduction sufficiently large such that the chamber will not restrict the progressively diminishing gas flow beyond that which would normally take place under the normal volute reduction as if the chamber divided parts had continued throughout the chamber common part. Additionally, it is preferred that the circumferential termination of the housing chamber divider be generally angled from direct radial initially at the minimum radius and progressively circumferentially to the maximum radius with the greatest circumferential extension of such divider being in the order of between approximately 180° and 300°.

15 Claims, 10 Drawing Figures

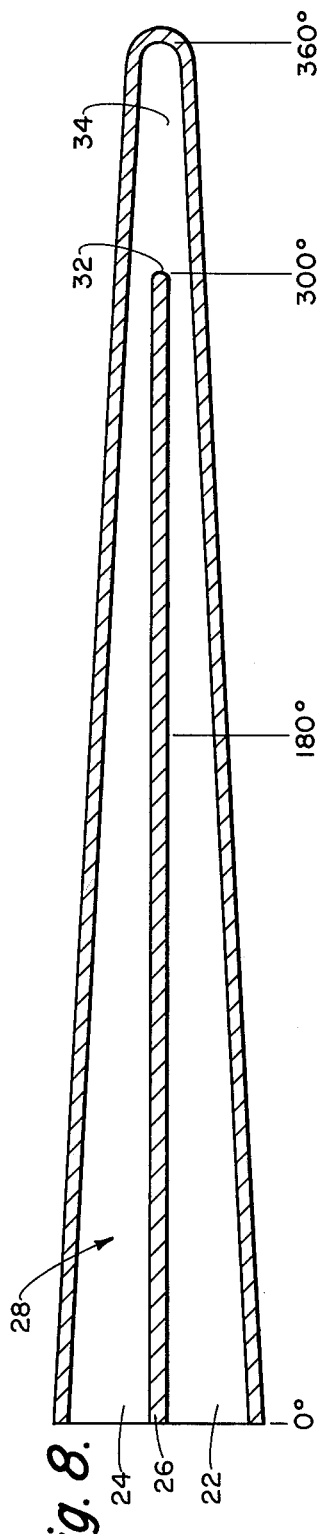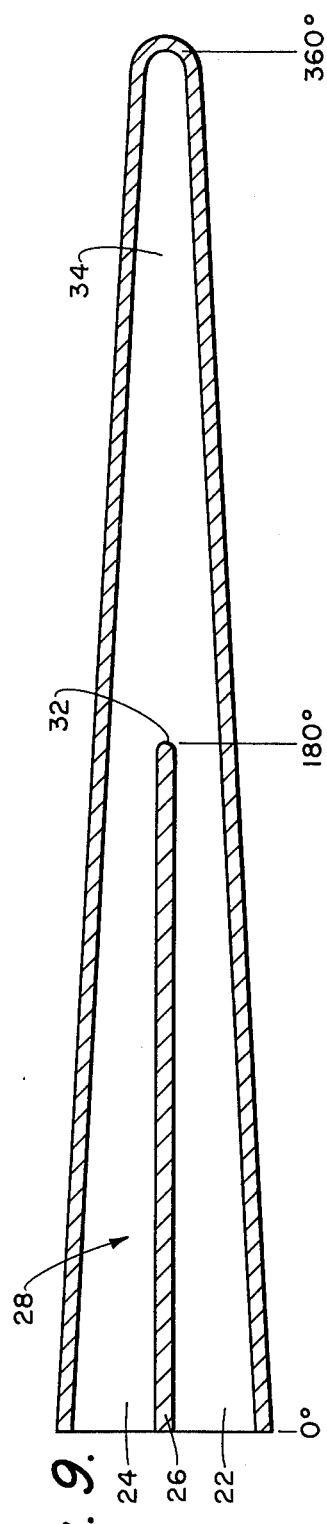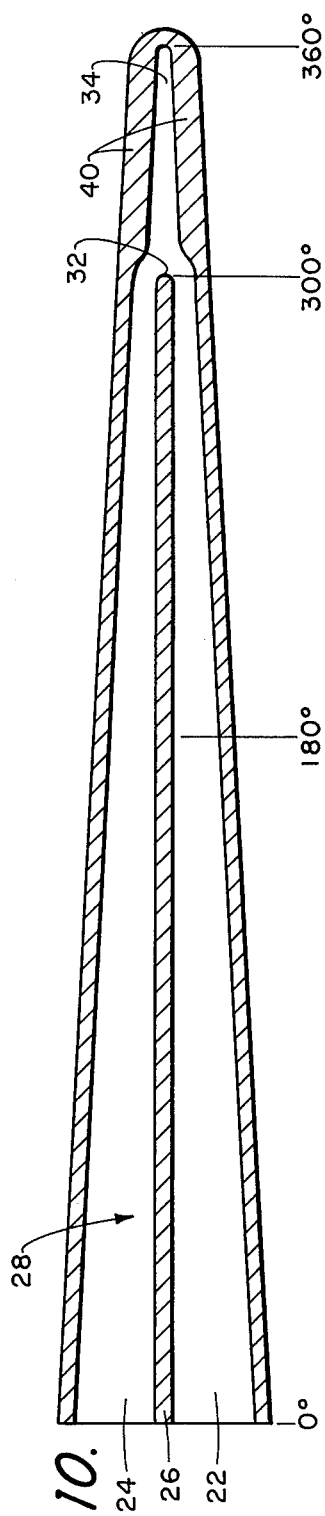

PARTIALLY DIVIDED TURBINE HOUSING FOR TURBOCHARGERS AND THE LIKE

BACKGROUND OF THE INVENTION

This invention relates to a partially divided turbine housing for turbochargers and the like, and more particularly, to a radial inflow, volute turbine housing of the foregoing type particularly useful in turbocharger applications for use with internal combustion engines having divided exhaust manifolds. The novel partially divided turbine housing, particularly in such applications, provides increased efficiency of varying degrees dependent on the type, size and characteristics of the internal combustion engine with which it is matched and the equally matched degree of housing chamber division. Furthermore, such increased efficiency is most apparent in direct comparison with either the prior fully divided or the prior fully undivided turbine housing structures.

The general use of turbochargers for increasing the efficiency of internal combustion engines is well known. In broad terms, the turbocharger is in the form of a turbo compressor assembly wherein the compressor impeller supplies a pressurized flow of air to the cylinders of the engine and with proper calculation and matching, increases the efficiency of combustion of the engine to in turn increase the usable engine power received therefrom. The turbine wheels are most frequently driven by directing the flow of exhaust gases from the engine into the turbine housing of the turbocharger and through various housing chamber formations against the turbine wheel for driving the same.

Furthermore, it has been found that one of the more preferred types of turbine housings for use in turbochargers from the standpoint of both efficiency and convenience is that having radial inflow into a 360° volute housing chamber. The turbine driving exhaust gases are fed into the volute housing chamber and progressively feed generally radially inwardly into the central turbine wheel location to rotate the turbine wheel which, in turn, rotates a compressor which feeds air to the engine cylinders. Due to the gradually decreasing radial cross section of the volute housing chamber, as portions of the exhaust gases flow inwardly into the turbine wheel so as to progressively reduce the quantity of flow, the velocity of flow of the exhaust gases is maintained and maximizes the energy transmitted to the turbine wheel.

Another important factor which must be considered in the selection and design of turbochargers for internal combustion engines wherein the turbochargers are driven by the engine exhaust gases involves the particular inherent manner of exhaust gas flow from the engine cylinders. Considering any individual cylinder of virtually any internal combustion engine, once the power stroke has taken place, the exhaust valve begins to open for expelling the exhaust gases from the cylinder into the exhaust manifold. Furthermore, at the initial opening of the exhaust valve the hot exhaust gases within the cylinder are at high pressure.

Consequently, as the exhaust valve begins to open releasing these high pressure hot gases, there is an initial, sharply defined surge wherein the major portion of the hot exhaust gases quickly flow or surge at high velocity into the exhaust manifold. Following, during the remainder of the period that the exhaust valve is open, the flow of exhaust gases from the cylinder is at relatively low velocity as compared to this initial surge, then being primarily caused by normal piston movement decreasing the volume of the cylinder. This means that the resulting flow of exhaust gases within an engine exhaust manifold is primarily in surges or pulses and not in the ideal constant or smooth velocity form for being fed to and driving the turbine wheel of a turbocharger.

Adding to the complexity of the considerations is the fact that internal combustion engines are, of course, of multiple cylinder design and frequently provided with divided exhaust manifolds directing the exhaust gases to a common turbocharger. This means that one side of the divided exhaust manifold will serve one bank of cylinders pulsating at different times and the other half of the exhaust manifold will serve the other bank of cylinders pulsating at different times. Considering that a common turbocharger is being used, the normal requirement would be to join the exhaust gas flows in the exhaust manifold halves at the turbocharger so that a single exhaust gas flow is directed into the turbine housing, but unless the pulses in the exhaust gas flow in each exhaust manifold half perfectly coincide, a high pressure pulse at one half can coincide with a low pressure period between pulses in the other half so as to greatly inhibit the overall flow of exhaust gases to the turbine housing and greatly reduce the efficiency of the turbocharger.

In order to eliminate this problem, various prior attempts have been made to minimize the effect thereof, that is, a high pressure pulse of one exhaust manifold half feeding into the low pressure period of the other exhaust manifold half inhibiting gas flows in each. For instance, certain prior turbocharger constructions have included a divider at the inlet into the turbine housing chamber of the turbocharger so as to extend or continue the division of the exhaust manifold halves into the initial portion of the turbine housing chamber and not attempt to mix the divided gas flows until initial housing gas flow patterns have been established. By arcuately shaping and blending the housing chamber inlet into the housing chamber proper and by terminating the divider at the commencement of the actual circumference of the housing chamber proper some slight improvements in exhaust gas flow have been made, while at the same time, according to the prior theories involved, not increasing the complexity of formation of the housing chamber proper, retaining it in its common volute form.

Major advances in solving the problem, however, have been made by not only providing a divider between the two gas flows at the turbine housing inlet portion, and particularly a radially extending divider, but continuing this radially extending divider completely around the total circumference of the turbine housing chamber. In other words, the turbine housing chamber is completely axially separated into two separate gas flow passages throughout the circumferential extent thereof, each separate gas flow passage progressively reducing in radial cross section in a normal volute manner and each communicating radially inwardly with the turbine wheel. Thus, by connecting the inlet of each of these separate housing chamber gas passages to the separate halves of the divided exhaust manifold of the engine, each acts as a separate unit generally independent of the other so that the effect of the pulses in each generally has no effect on the other, at least until the respective gas flows mix within the turbine wheel.

Although these fully divided turbine housings for turbochargers have provided, as stated, major advances in diminishing the effects of the discussed pulse problems within exhaust gas flows, it has been discovered that according to the principals of the present invention further unique refinements in turbine housings for turbochargers can be made which will produce markedly superior results and even further improve the efficiency of turbochargers as used with internal combustion engines.

OBJECTS AND SUMMARY OF THE INVENTION

It is, therefore, an object of this invention to provide a turbine housing for turbochargers and the like, the turbine housing being of the radial inflow, volute type, wherein the housing chamber is divided throughout the radial inlet thereof and for a substantial initial portion of the circumference thereof, while being undivided and having a common chamber passage over the final chamber portion. By matching the extent of division of the housing chamber with the characteristics of the particular engine with which the turbocharger is to be used, and particularly with engines having a divided exhaust manifold, it has been discovered that the engine efficiency can be improved over that in use with the prior turbocharger constructions. For instance, it is possible to provide improved engine efficiency over use of the prior turbochargers having substantially no housing chamber division or the opposite extreme of a total housing chamber division.

It is a further object of this invention to provide a partially divided turbine housing for turbochargers and the like of the foregoing type and usable for the foregoing purposes wherein the volute turbine housing chamber is divided into axially adjacent gas flow passages over the initial approximately 180° to 300° of circumference thereof, and is undivided over the remaining circumference thereof. The divided gas passages open circumferentially into the final single gas passage and all the passages communicate generally radially into the usual general central turbine wheel location. As hereinbefore stated, the extent of the division within the approximately 180° to 300° limits is dependent on the characteristics of the particular engine with which the turbocharger is to be used and must be properly matched for the maximum efficiency benefits.

It is still a further object of this invention to provide a turbine housing for turbochargers and the like of the foregoing general structure wherein, in the preferred form thereof, the termination of the divider within the turbine housing chamber, regardless of where within the stated termination zone such termination takes place is in a progressive manner commencing initially at the minimum radial limits thereof and generally angling in a circumferential direction toward the completely open or common chamber portion until reaching the maximum radial extent thereof. In this manner, the separate exhaust gas flows from the divided, individual, volute gas passages within the turbine housing chamber are mixed in their circumferential flow within the final common housing chamber portion on a somewhat progressive basis so as to reduce the turbulence affect of the gases during such mixing which could have an adverse effect on gas flow and resulting efficiency. Thus, again in the preferred form, the housing chamber divider will have its maximum extension under the lower limit at 180° of circumference and at the upper limit at 300° of circumference.

It is also an object of this invention to provide a partially divided turbine housing for turbochargers and the like of the foregoing general structure wherein, still again in the preferred form, the exhaust gas flow confinement throughout the entire circumference of the turbine housing chamber, regardless of whether the gas flow is taking place in the divided portions thereof or in the common portion thereof, is never increased beyond the normal progressive volute reduction. It is believed that in a majority of situations, at the transition of gas flow between the divided gas flow passages and the subsequent common gas flow passage, the housing chamber radial cross section at such transition and beyond should not be reduced below the normal progressive volute reduction that would normally take place as if the divided gas passages were continued circumferentially throughout the housing chamber circumference. By this lack of increased restriction and only reducing the housing chamber radial cross section in its normal volute manner, gas flow turbulence of the separate gas flows mixing into a single gas flow can be controlled while not increasing frictional forces which could inhibit the efficiency of the turbocharger and the resulting efficiency of the engine with which the turbocharger is being used.

Other objects and advantages of the invention will be apparent from the following specification and the accompanying drawings which are for the purpose of illustration only.

BRIEF DESCRIPTION OF THE DRAWINGS

FIG. 8 is a circumferential sectional plan layout of the housing chamber of FIGS. 1 and 2 wherein the divider extends to the upper limit of 300° of housing chamber circumference;

FIG. 9 is a circumferential sectional plan layout of the housing chamber of FIG. 7 wherein the divider extends to the lower limit of 180° of housing chamber circumference; and FIG. 10 is a circumferential sectional plan layout of the embodiment of housing chamber of FIG. 6 wherein the divider extends to the upper limit of 300° of housing chamber circumference.

Figure 1:
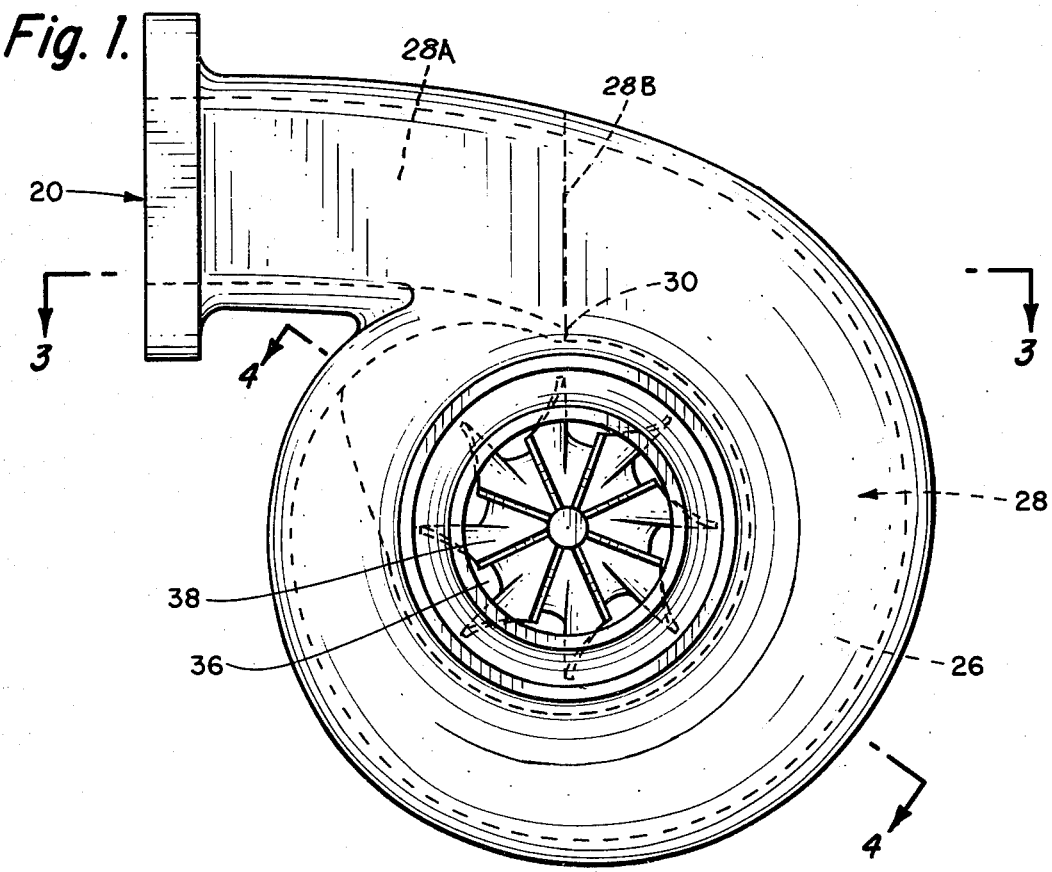
FIG. 1 is a side elevational view of a partially divided turbine housing for turbochargers and the like incorporating a preferred embodiment of the principals of the present invention, the divider extending at the upper limit of 300° of housing chamber circumference.

DESCRIPTION OF THE BEST EMBODIMENTS CONTEMPLATED:

Referring for the moment only generally to the drawings and as hereinbefore discussed, radial inflow turbine housings for turbochargers are constructed with the gas flow passage thereof of volute form for the reason that the internal combustion engine exhaust gases are directed into the turbine housing chamber through the generally radial inlet and portions of such gas flow progressively pass generally radially inwardly into the generally central turbine wheel location while the remaining portions of the gases flow continuously circumferentially around the housing chamber. In other words, during the main exahust gas flow circumferentially around the housing chamber, portions thereof are progressively flowing inwardly into the turbine wheel so that the total gas flow quantity is progressively reduced and after 360° of housing chamber flow has all been fed inwardly into the tubine wheel. By use of the volute shaped housing chamber with the progressively decreasing radial cross section, as the main gas flow decreases, the housing chamber decreases so that the gas flow is maintained generally at a constant velocity and at a constant pressure, most satisfactory for driving the turbine wheel if that were all that need be considered.

As also hereinbefore discussed, however, due to the characteristics of the exhaust gas flow from each of the cylinders of an internal combustion engine into the exhaust manifold and ultimately to the turbine housing of the turbocharger, the exhaust gas flow as it arrives at the turbine housing is in surges or pulses for the reasons clearly pointed out. The frequency of these gas flow surges or pulses is obviously dependent on the number of cylinders of the internal combustion engine, all of which contribute to make up the total gas flow, and the speed of the internal combustion engine. The greater number of total engine cylinders or the higher the engine speed, the more frequent the pulses and the closer in space of time of one pulse partially blending into the next pulse. The less the number of engine cylinders or the slower the engine speed, the less frequent the pulses and the greater spacing thereof.

Although the pulsing and the consequent unevenness of exhaust gas flow in turbochargers must be tolerated since they result from the inherent characteristics of an internal combustion engine, this pulsing exhaust gas flow presents major problems with internal combustion engines having divided exhaust manifolds. At a given instant, a pulse in the gas flow from one side of the exhaust manifold can coincide with a low pressure period of the other side of the exhaust manifold. The result is that the gas in the pulsing side of the exhaust manifold can partially overcome and enter the gas flow from the low pressure side of the exhaust manifold with obvious gas flow efficiency consequences and particularly driving the turbine wheel of the turbocharger.

This latter problem has been attempted to be solved by the prior turbocharger constructions through the use of radial dividers in the turbine housing chambers of the turbochargers, such radial dividers extending throughout the housing chamber inlet and completely around the 360° of the housing chamber thereby axially dividing the housing chamber into axially adjacent gas passages both progressively feeding gas to the turbine wheel throughout such circumference. One housing chamber gas passage is connected to one side of the exhaust manifold and the other housing chamber gas passage is connected to the other side of the exhaust manifold, thereby preventing any possibility of feedback of one side of the exhaust manifold into the other. Again, on initial considerations, a fully divided turbine housing chamber would appear to solve the problems.

According to the principals of the present invention, however, it has been found that even greater turbocharger efficiencies can be obtained by a critical consideration of an added factor, namely, the impediment of efficient housing chamber circumferential gas flow due to friction. Obviously, with a volute housing chamber, the radial cross section of the housing chamber is maximum at the beginning of such chamber gradually decreasing to zero cross section at the circumferential terminus thereof. Thus, in approximately the last 180° of circumference of the housing chamber, the divided gas passages of the chamber are becoming smaller and smaller in radial cross section so that the wetted wall surfaces become a larger and larger factor as to the friction of gas flow in such passages.

Furthermore, it has been found that somewhere between approximately 180° of housing chamber circumference and approximately 300° of housing chamber circumference, the added friction of gas flow created by the increased wall surface compared to radial cross section of the radially divided gas passages more then overcomes the advantages of the axially divided housing chamber. At this point in the housing chamber circumference, the housing chamber divider should be terminated and the divided gas flows brought together into a single or common gas flow for the remainder of the housing chamber circumference. The exact circumferential extension of the housing chamber divider and the circumferential location of termination thereof to provide the maximum turbocharger efficiency and consequent engine efficiency advantages, in other words, at what point the added friction of gas flow more then overcomes the advantages of the axially divided housing, depends on many factors including the number of engine cylinders, the engine speed range, the turbine housing size of the turbocharger and the turbine housing area ratio of the turbocharger, the latter being a ratio of housing chamber cross sectional area over chamber radius.

In general, the lower the number of cylinders of the internal combustion engine with which the turbocharger is used, or the lower the speed range of the engine, the greater the benefit of the divided turbine housing. Thus, the closer to the 300° upper limit the housing chamber divider should extend. The greater number of engine cylinders or the greater the engine speed range, the lesser effect of the housing chamber divider and the closer to the lower 180° of circumference limit the chamber divider should extend.

At the same time, these factors must be balanced with the particular turbocharger wherein housing size and area ratio are critical factors. The larger the turbocharger housing, the greater the circumferential extent of the housing chamber divider, this variation being a function of the relative roughness of the walls of the housing chamber gas passages with respect to the size of such gas passages, as well as the velocity of the gases. The physically larger housing chambers will have less friction for a given surface roughness than the smaller housings, and the larger area ratio housings will have lower gas velocities and therefore less friction than the smaller area ratio housings, all of which must be considered and balanced for selection of the most efficient housing chamber divider extension within the minimum limit of approximately 180° and the maximum limit of approximately 300° of housing circumference.

Referring to FIGS. 1 through 5 of the drawings, a turbine housing for turbochargers incorporating the principals of the present invention is shown illustrating the upper approximate limit of housing chamber divider extension. The turbine housing includes a housing chamber 28 and an inlet chamber 28A. The chambers are fully divided into two axially adjacent gas flow passages 22 and 24 by a radial divider 26. The housing chamber progressively decreases in cross section commencing usual volute form from inlet 28B thereof into usual volute turbine housing chamber generally indicated at 28 so that the gas flow passages 22 and 24 likewise progressively decrease in cross section from entrance into the turbine housing chamber.

Figure 4:
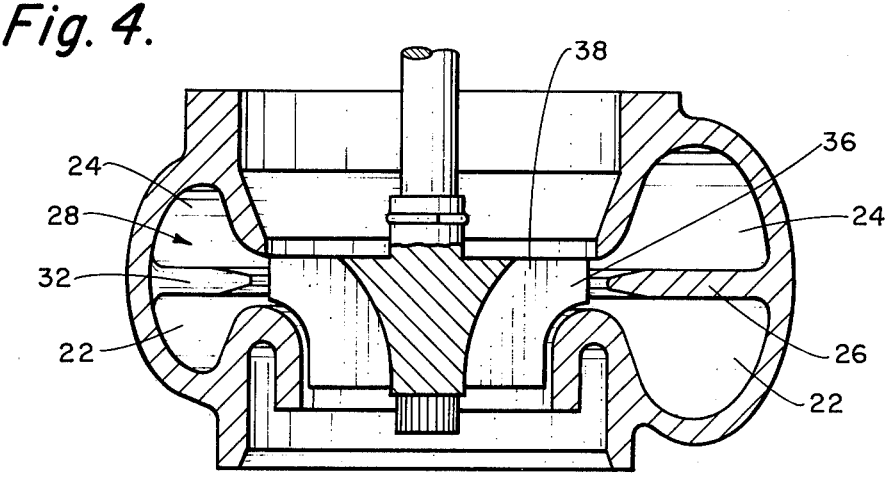
FIG. 4 is a diametrical sectional view of the turbine housing proper looking in the direction of the arrows 4—4 in FIG. 1.
Figure 5:
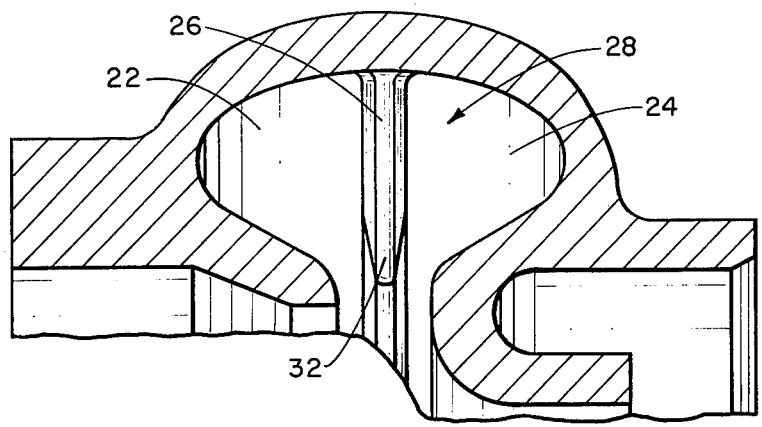
FIG. 5 is a radial sectional view of the turbine housing proper looking in the direction of the arrows 5—5 in FIG. 2.

The radial divider 26 is continuous from the inlet chamber inlet 20, the inner end of the housing chamber inlet 28B being defined by a usual tongue 30, from zero degrees of circumference of the turbine housing chamber 28 to approximately 300° of circumference of the turbine housing chamber. Thus, the axially adjacent gas flow passages 22 and 24 continue throughout the inlet chamber from inlet 20 and from zero degrees to approximately 300° of the circumference of the turbine housing chamber 28 and at a circumferential terminal edge 32 of the radial divider 26, these previously axially separated gas flow passages join circumferentially into a single or common gas flow passage 34 extending circumferentially the remainder of the turbine housing chamber 28 to the tongue 30. In all cases, as best seen in FIGS. 2, 4 and 5, all of the axially separated gas flow passages 22 and 24 and the common gas flow passage 34 open generally radially in usual manner into a generally central turbine wheel location 36 for feeding exhaust gases progressively around the circumference of the turbine housing chamber 28 to rotatably drive a usual turbine wheel 38.

Figure 2:
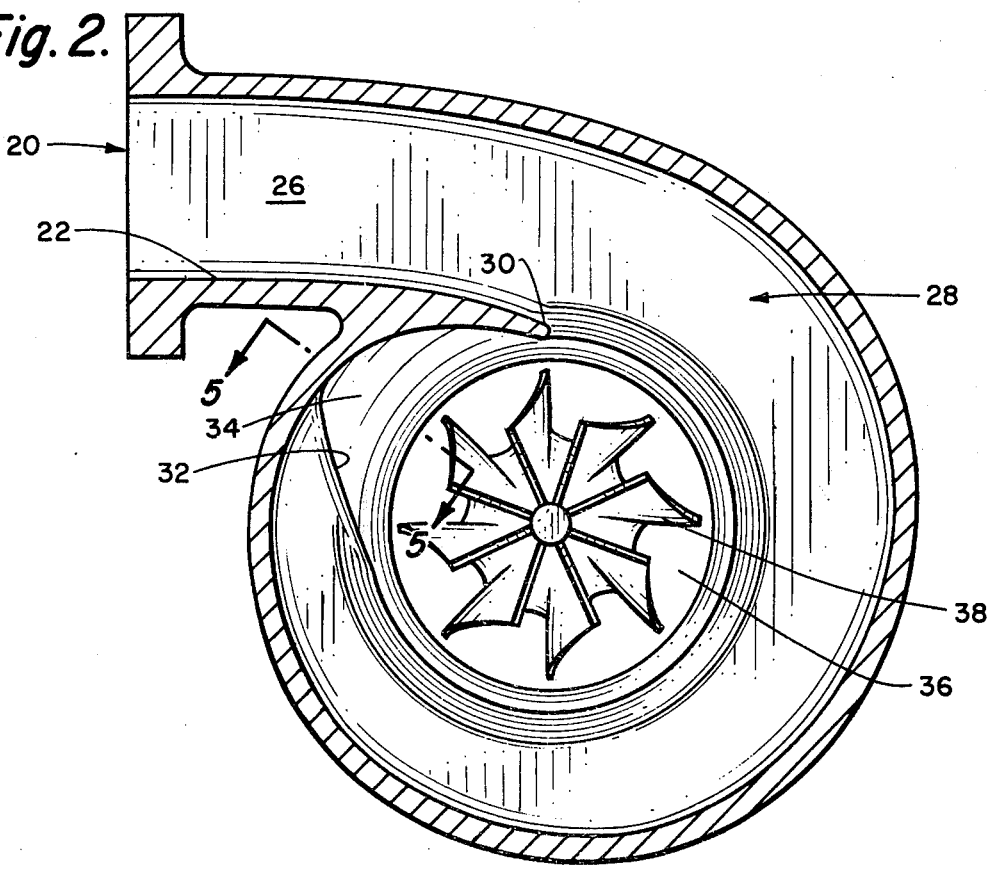
FIG. 2 is a vertical sectional view of the turbine housing of FIG. 1.
Figure 3:
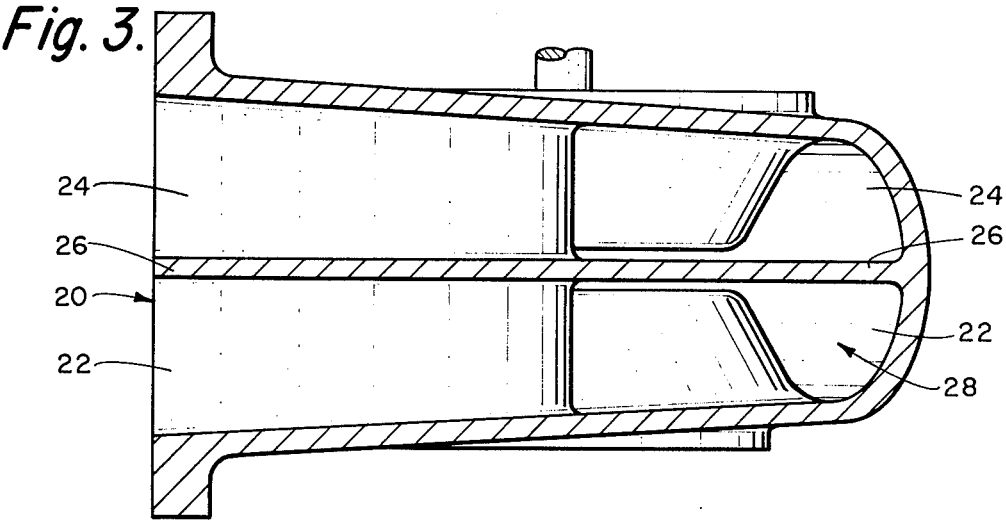
FIG. 3 is a horizontal sectional view looking in the direction of the arrows 3—3 in FIG. 1.

The circumferential termination of the radial divider 26 as defined by the divider terminal edge 32 and seen for instance in FIG. 2 is preferably generally circumferentially angled terminating initially at the divider minimum radial dimensions and progressively radially outwardly to the divider maximum radial dimensions. This generally angled termination of the radial divider 26 is preferred not only for the purpose of fabrication of the turbine housing, but more important, to somewhat progressively mix the separate exhaust gas flows from the separated gas flow passages 22 and 24 into a single exhaust gas flow stream in the common gas flow passage 34 with less disturbance and turbulence of the overall exhaust gas flow. It is also preferred that the greatest circumferential extension of the radial divider 26, in other words, the greatest circumferential extension of the divider terminal edge 32 will be at the maximum approximately 300° of circumference of the turbine housing chamber 28.

Figure 7:
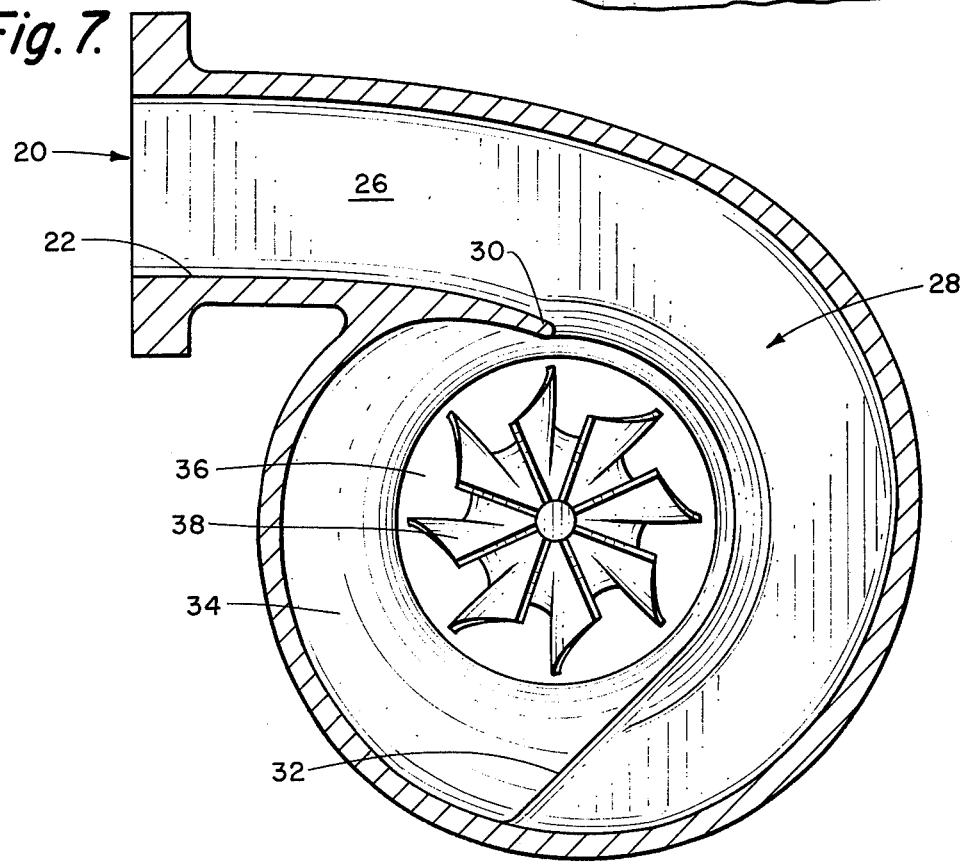
FIG. 7 is a vertical sectional view identical to FIG. 2 with the exception that the divider extends to the low limit of 180° of housing chamber circumference.

For further illustrating the principals of the present invention, the partially divided turbine housing is illustrated in FIG. 7 with the radial divider 26 extending circumferentially of the turbine housing chamber 28 the minimum extent so as to terminate at approximately 180° of turbine housing chamber circumference. The radial divider 26 preferably terminates circumferentially in the same angled configuration with the maximum circumferential extension being at the approximate 180°. Thus, in this case, the gas flow passages 22 and 24 extend approximately 180° of the turbine housing chamber 28 and the single or common gas flow passage 34 extends approximately an equal circumferential distance.

At either of the upper and lower limits of radial extension of the radial divider 26, or at any circumferential divider termination therebetween, as determined by all of the previously discussed factors, the axially separated gas flow passages 22 and 24 are respectively connected in communication with opposite sides of the usual divided exhaust manifold (not shown) of the particular internal combustion engine (not shown) with which the turbocharger is to be used. All of the divided gas flow passages 22 and 24 and the common gas flow passage 34 progressively feed the engine exhaust gases generally radially inwardly to the turbine wheel location 36 and against the turbine wheel 38 to rotate the turbine wheel and with greater efficiency by reduction of the exhaust gas flow friction as hereinbefore discussed. The turbine wheel 38 is, of course, connected for driving the usual compressor (not shown) for directing the pressurized air supply to the internal combustion engine. Furthermore, if conditions dictate, the well-known fluid flow directing vanes may be located within any one or all of the gas flow passages 22, 24 and 34 of the turbine housing chamber 28 as is well-known and not illustrated herein.

For convenience or illustration, plan layouts of the upper and lower radial divider limits of the radial divider 26 in the turbine housing chamber 28 are shown in FIGS. 8 and 9, FIG. 8 showing the upper limit of the turbine housing of FIGS. 1 through 5 and FIG. 9 showing the lower limit of FIG. 7. As can be seen in each, the axially separated gas flow passages 22 and 24 decrease progressively in volute manner from zero degree of housing chamber circumference to termination circumferentially of the radial divider 26 at approximately 300° for the maximum limit and approximately 180° for the minimum limit of radial divider circumferential extension. At termination of the radial divider 26, the axially separated gas flow passages 22 and 24 open circumferentially into the still volute progressively decreasing common gas flow passage 34 which continues its volute reduction to the end of the turbine housing chamber 28. Thus, as is determined by all of the factors hereinbefore discussed as to the choice of extension of the radial divider 26, when the gas flow friction becomes a factor within the axially divided gas flow passages 22 and 24 overcoming the advantages of such passage separation, the opposite surfaces of the radial divider 26 are removed and the two gas flow passages are joined into one, the common gas flow passage 34, to increase the overall efficiency of driving the turbine wheel 38 and thereby the efficiency of the internal combustion engine with which the particular turbocharger is assembled.

Figure 6:
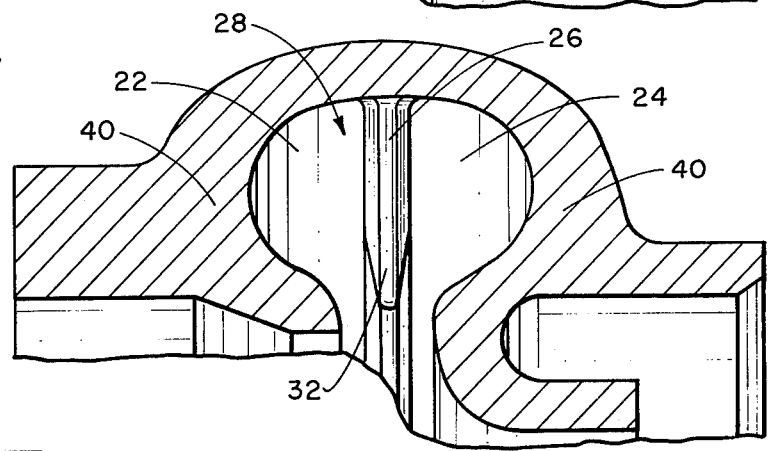
FIG. 6 is a radial sectional view similar to FIG. 5, but of a second embodiment of the partially divided turbine housing of FIG. 1.

A second embodiment slightly modified partially divided turbine housing according to further principals of the present invention is illustrated in radial cross section in FIG. 6 and in plan layout in FIG. 10. Referring to FIG. 2, the radial section of FIG. 6 is taken on the same line as the radial section of FIG. 5 in FIG. 2 and except for a predicated radial cross sectional reduction in the common gas flow passage 34 at circumferential termination of the radial divider 26, this second embodiment turbine housing is identical to that of FIG. 2 and previously described. As can be seen in FIGS. 6 and 10, at the circumferential termination of the radial divider 26 the turbine housing walls 40 determining the progressive radial cross section reduction of the common gas flow passage 34 are thickened so that although the common gas flow passage 34 still progressively reduces in cross section in a volute fashion, the cross sectional size at any circumferential location is reduced from that of the turbine housing of FIGS. 1 through 5 and having the plan layout of FIG. 8.

In the particular size shown in FIG. 10, the common gas flow passage 34 is reduced to have an equivalent volute reducing cross section generally equal to the sum of the two divided gas flow passages 22 and 24 as if these two divided gas flow passages were continued in normal volute reduction throughout the remainder of the turbine housing chamber 28 or throughout this common gas flow passage. It is believed that this is the maximum that this common gas flow passage 34 can be reduced, in other words, this is the minimum common gas flow passage that can be used, and that such reduction will contribute to maintain gas flow velocity during the transition from two gas flow passages to the common one, as well as reduce the turbulence of such transition. As stated, the size equivalence shown is believed to be the lower limit and depending on the various other factors hereinbefore discussed, similar benefits can be obtained by limiting such reduction to various levels between the extremes of FIGS. 8 and 10.

In order to more clearly illustrate the partially divided turbine housing principals of the present invention, two power tests were conducted, one with an internal combustion engine having a medium speed range and a second with an internal combustion having a relatively low speed range. The medium speed engine was a six cylinder engine with a divided exhaust manifold and using an approximate midsize turbocharger with an area ratio of 1.00. The low speed engine was a four cylinder engine with a divided exhaust manifold using an approximate midsize turbocharger having an area ratio of 1.54.

In both tests, the engines were operated using turbochargers having a standard fully divided housing chamber, a 180° divided housing chamber, and a 270° divided housing chamber, all other factors being maintained constant. The power results expressed in brake horsepower at various engine speed settings over the respective engine speed ranges are tabulated below:

| Engine Speed RPM | Standard Full Divided Housing B.H.P. | 180° Divided Housing B.H.P. | 270° Divided Housing B.H.P. |
|---|---|---|---|
| APPROXIMATE MID-SIZE TURBOCHARGER SIX-CYLINDER ENGINE A/R = 1.00 | | | |
| 2100 | 248.5 | 251.9 | 256.8 |
| 2000 | 243.2 | 247.9 | 254.6 |
| 1900 | 246.7 | 250.7 | 254.5 |
| 1800 | 238.7 | 239.9 | 250.7 |
| 1700 | 234.5 | 248.1 | 252.1 |
| 1600 | 230.3 | 236.2 | 248.4 |
| 1500 | 221.9 | 229.9 | 235.9 |
| 1400 | 210.8 | 215.5 | 228.6 |
| 1300 | 200.1 | 200.1 | 215.7 |
| 1200 | 184.7 | 176.7 | 195.5 |
| APPROXIMATE MID-SIZE TURBOCHARGER FOUR-CYLINDER ENGINE A/R - 1.54 | | | |
| 1200 | 153.6 | 148.8 | 153.6 |
| 1100 | 147.4 | 140.8 | 149.6 |
| 1000 | 141.0 | 132.0 | 144.0 |
| 900 | 127.8 | 126.0 | 131.4 |

First considering the medium speed, six cylinder engine tests, according to the principals of the present invention, the higher speed and the greater number of cylinders of this engine would indicate that the turbocharger pulsing exhaust gas flow problems would be somewhat reduced and the advantages of reduction of friction in the exhaust gas flow could be more completely taken advantage of which is exactly what the test results show. As can be seen, engine power and efficiency were improved over the standard fully divided housing chamber by reducing the divided housing to 180°, and even greater improvements were made by reducing the divided housing to 270°.

Considering the test of the engine having the lower speed range and the lesser number of cylinders, the lesser frequency of pulses would be expected to increase the criticality of the fully divided housing chamber. The results of this test indicate that the turbocharger with the standard fully divided housing chamber is superior in efficiency over the turbocharger with the 180° divided housing chamber, but the turbocharger with the 270° divided housing chamber is quite superior over the total speed range. Thus, even in this most critical lower speed and fewer cylinder engine category where the fully divided housing chamber would be most critical, with proper selection, the partially divided housing chamber construction of the present invention is marketly superior.

According to the principals of the present invention, therefore, a radial inflow, volute, partially divided turbine housing for turbochargers is provided for use with internal combustion engines having divided exhaust manifolds which results in increased efficiency of internal combustion engine performance over the prior standard fully divided turbocharger housings. Clearly, increased efficiency of varying degrees can be appreciated dependent on the type, size and characteristics of the internal combustion engine as matched with a particular degree of turbocharger housing chamber division, all as hereinbefore discussed and as particularly defined in the appended claims.

I claim:

1. In a radial inflow turbine housing for turbochargers and the like, said housing being of the type having a generally 360° volute housing chamber surrounding a radial flow bladed turbine wheel, and an inlet chamber upstream of said volute housing chamber and terminating at the inlet to said volute housing chamber, said volute housing chamber being arranged for receiving gas flow from said inlet chamber and exhausting said gas flow progressively generally radially inwardly circumferentially around said volute housing chamber into said radial flow bladed turbine wheel; the improvement comprising: a radial divider throughout said inlet chamber and continuously circumferentially around said volute housing chamber and extending radially closely adjacent the periphery of said radial flow bladed turbine wheel, said radial divider separating both said inlet chamber and said volute housing chamber into circumferentially continuous axially separated first parts, said volute housing chamber axially separated first parts each exhausting its respective gas flow progressively generally radially into said radial flow bladed turbine wheel circumferentially throughout said separated first parts, said radial divider in said volute housing chamber extending circumferentially continuously from said volute housing chamber inlet and terminating not less than 180° and not more than 300° from said inlet of said volute housing chamber with said volute housing chamber having an undivided second part the remainder of said 360° thereof about the periphery of said radial flow bladed turbine wheel whereby gas flow received in said undivided second part of said volute housing chamber from said volute housing chamber axially separated first parts is exhausted progressively generally radially into said radial flow bladed turbine wheel.

2. In a radial inflow turbine volute housing as defined in claim 1 in which said housing chamber in said undivided second part thereof has an internal radial cross-sectional area at any circumferential location at least as great as the combined internal radial cross-sectional areas of the preceding axially first separated parts in their normal progressive volute reduction equivalent to that circumferential location.

3. In a radial inflow turbine housing as defined in claim 1 in which said volute housing chamber in said undivided second part thereof has an internal radial cross-sectional area at any circumferential location generally equal to the combined internal radial cross-sectional areas of the preceding axially separated first parts in their normal progressive volute reduction equivalent to that circumferential location.

4. In a radial inflow turbine housing as defined in claim 1 in which circumferential termination of said radial divider in said volute housing chamber is angled generally radially outwardly in a circumferential direction towards said volute housing chamber undivided second part, maximum divider circumferential extension from said volute housing chamber inlet to the terminal end of said radial divider being not less than 180° and not more than 300°.

5. In a radial inflow turbine housing as defined in claim 1 in which said volute housing chamber in said undivided second part thereof has an internal radial cross-sectional area at any circumferential location at least as great as the combined internal radial cross-sectional areas of the preceding axially separated first parts in their normal progressive volute reduction equivalent to that circumferential location; and in which the circumferential termination of said radial divider in said volute housing chamber is angled generally radially outwardly in a circumferential direction toward said housing chamber undivided second part, maximum divider circumferential extension from said volute housing chamber inlet to the terminal end of said radial divider being not less than 180° and not more than 300°.

6. In a radial inflow turbine housing for turbochargers and the like, said housing being of the type having a generally 360° volume housing chamber surrounding a radial flow bladed turbine wheel, and an inlet chamber upstream of said volute housing chamber and terminating at the inlet to said volute housing chamber, said volute housing chamber being arranged for receiving gas flow from said inlet chamber and exhausting said gas flow progressively generally radially inwardly circumferentially around said volute housing chamber into said radial flow bladed turbine wheel; the improvements comprising: radial walls throughout said inlet chamber and continuously circumferentially around said volute housing chamber and extending radially closely adjacent the periphery of said radial flow bladed turbine wheel, said radial walls separating both said inlet chamber and said volute housing chamber into axially separated first parts and extending continuously circumferentially from said volute housing chamber inlet and terminating not less than 180° and not more than 300° from said inlet of said volute housing chamber, the remaining second part of said 360° volute housing chamber being undivided about the periphery of said radial flow bladed turbine wheel whereby gas flows from said axially separated first parts of said volute housing chamber into a common chamber single second part extending circumferentially the remainder of said volute housing chamber, all of said volute housing chamber parts exhausting gas flow generally radially inwardly into said radial flow bladed turbine wheel throughout said parts.

7. In a radial inflow turbine housing as defined in claim 6 in which said common chamber single second part has an internal radial cross-sectional area at any radial location thereof at least as great as a normal progressive volute reduction of the combined internal radial cross-sectional areas of said volute housing chamber axially separated first parts as if said volute housing chamber axially separated first parts had been continued circumferentially to that radial location.

8. In a radial inflow turbine housing as defined in claim 6 in which said common chamber single second part has an internal radial cross-sectional area at any radial location thereof generally equal to a normal progressive volute reduction of the combined internal radial cross-sectional areas of said volute housing chamber axially separated first parts as if said volute housing chamber axially separated first parts had been continued circumferentially to that radial location.

9. In a radial inflow turbine housing as defined in claim 6 in which said volute housing chamber axially separated parts open circumferentially into said common chamber single second part at a progressively later circumferential location from radially inward to radially outward, said volute housing chamber axially separated first parts having totally converted from said separated first parts into said common chamber single second part not prior to said 180° and at least by said 300° of said chamber circumference from said volute housing chamber inlet.

10. In a radial inflow turbine housing as defined in claim 6 in which said common chamber single second part has an internal radial cross-sectional area at any radial location thereof at least as great as a normal progressive volute reduction of the combined internal radial cross-sectional areas of said volute housing chamber axially separated first parts as if said volute housing chamber axially separated first parts had been continued circumferentially to that radial location; and in which said volute housing chamber axially separated first parts open circumferentially into said common chamber single second part at a progressively later circumferential location from radially inward to radially outward, said volute housing chamber axially separated first parts having totally converted from said said separated first parts into said common chamber single second part not prior to said 180° and at least by said 300° of said chamber circumference from said volute housing chamber inlet.

11. In a method of directing separated gas flows through a radial inflow, volute, generally 360° turbine housing chamber generally radially inwardly into a generally centrally located radial flow bladed turbine wheel of a turbocharger and the like; the steps of maintaining axial separation of the gas flows at the inlet to said volute housing chamber and circumferentially continuously for between 180° and 300° of the circumference of said volute housing chamber from said inlet;

joining the remainder of said separated gas flows into a single common gas flow throughout the remainder of said 360° of volute housing chamber circumference; during both said separated and single gas flows continuously progressively flowing portions of each of said separated and single gas flows generally radially inwardly into said radial flow bladed turbine wheel and during said separated gas flows maintaining said axial separation to closely adjacent the periphery of the entrance edges of said radial flow bladed turbine wheel.

12. In a method as defined in claim 11 in which said step of joining the remainder of said separated gas flows into a single gas flow includes maintaining said remainder of said separated gas flows at said joining and thereafter at progressive internal radial cross-sectional area confinements restricted not more than a normal internal volute progressive reduction of said separated gas flows as if said separated gas flows had been continued throughout said remainder of said chamber circumference.

13. In a method as defined in claim 11 in which said step of joining the remainder of said separated gas flows into a single gas flow includes maintaining said remainder of said separated gas flows at said joining and thereafter at progressive internal radial cross-sectional area confinements substantially equivalent to a normal internal volute progressive reduction of said separated gas flows as if said separated gas flows had been continued throughout said remainder of said chamber circumference.

14. In a method as defined in claim 11 in which said step of joining the remainder of said separated gas flows into a single gas flow includes the joining of said remainder of said separated gas flows into said single gas flow initially at a minimum chamber radius and then progressively radially outwardly along the circumference of said chamber, the total joining of said remainder of said separated gas flows into said single gas flow being at a housing circumferential location between 180° and 300° of said housing circumference from said volute housing chamber inlet.

15. In a method as defined in claim 11 in which said step of joining the remainder of said separated gas flows into a single gas flow includes maintaining said remainder of said separated gas flows at said joining and thereafter at progressive internal radial cross-sectional area confinements restricted not more than a normal internal volute progressive reduction of said separated gas flows as if said separated gas flows had been continued throughout said remainder of said chamber circumference; and in which said step of joining the remainder of said separated gas flows into a single gas flow includes the joining of said remainder of said separated gas flows into said single gas flow initially at a minimum chamber radius and then progressively radially outwardly along the circumference of said chamber, the total joining of said remainder of said separated gas flows into said single gas flow being at a housing circumferential location between 180° and 300° of said housing circumference from said volute housing chamber inlet.

* * * * *